United States Patent [19]
Wilson et al.

[11] Patent Number: 5,392,207
[45] Date of Patent: Feb. 21, 1995

[54] PROGRAMMABLE MOTION CONTROLLER WITH GRAPHICAL PROGRAMMING AID

[75] Inventors: Gregory S. Wilson, Merrimack County, N.H.; David E. Halpert, Windsor County, Vt.; Mark A. Chaffee, Grafton County, N.H.

[73] Assignee: Allen-Bradley Company, Inc., Milwaukee, Wis.

[21] Appl. No.: 109,783

[22] Filed: Aug. 20, 1993

[51] Int. Cl.⁶ .................... G05B 19/18; G05B 11/01
[52] U.S. Cl. ................... 364/167.01; 364/146; 364/147; 364/191; 364/192; 395/159; 318/568.1
[58] Field of Search ........... 364/140, 146, 147, 167.01, 364/188, 191, 192; 395/159, 161; 318/567, 568.1

[56] References Cited

U.S. PATENT DOCUMENTS

| | | | |
|---|---|---|---|
| 4,315,315 | 2/1982 | Kossiakoff | 364/191 |
| 4,827,404 | 5/1989 | Barstow et al. | 364/188 |
| 5,122,717 | 6/1992 | Hayashi | 364/474.01 |
| 5,168,441 | 12/1992 | Onarheim et al. | 364/146 |
| 5,173,869 | 12/1992 | Sakamoto et al. | 364/478 |
| 5,187,788 | 2/1993 | Marmelstein | 395/700 |
| 5,243,511 | 9/1993 | Zifferer et al. | 364/147 |
| 5,287,449 | 2/1994 | Kojima | 395/161 |
| 5,291,587 | 3/1994 | Kodosky et al. | 395/147 |
| 5,301,336 | 4/1994 | Kodosky et al. | 395/800 |

*Primary Examiner*—Paul P. Gordon
*Attorney, Agent, or Firm*—Keith M. Baxter; John J. Horn; H. Fredrick Hamann

[57] ABSTRACT

A programming aid for troubleshooting real-time motion control programs controlling servo motors employs a graphical control language in which functionally related groups of instructions are represented by icons displayed on a programming terminal and interconnected by sequence lines to indicate the order of the instruction's execution. The programming terminal receives the address of the instructions being executed and identifies this address to a displayed icon to modify the icon thus indicating the internal operation of the program on a real time basis with little interruption of the control process.

5 Claims, 5 Drawing Sheets

PROGRAMMABLE MOTION CONTROLLER WITH GRAPHICAL PROGRAMMING AID

FIELD OF THE INVENTION

This invention relates generally to motion controllers for providing real-time control of industrial servo motors, and more particularly to a method of programming such motion controllers.

BACKGROUND ART

Servo motors, including generally motors whose torque, position, or velocity may be controlled in response to a feedback signal, are used widely in industrial processes where control of these quantities is critical.

In application, the servo motor is typically associated with a sensor for providing a feedback signal for the controlled quantity. For example, for the control of either position or velocity, the sensor may be a position sensor sensing angular position of the motor. Two common position sensors are resolvers, providing phased sinusoidal outputs depending on the angle of the resolvers' input shaft, and rotary encoders, providing either a digital word indicating absolute angular position or a series of pulses indicating incremental motion and direction.

The servo motor is typically associated with a motor amplifier which provides power for driving the motor. For a DC servo motor, the servo amplifier is a high powered DC amplifier. More complex motor amplifiers are used for driving brushless AC motors where commutation of the current flow in the windings is required. Amplifiers which provide commutation also typically require a position feedback signal from the position sensor.

While some motor amplifiers may be programmed to provide rudimentary, higher-level control of the motor, such as setting limits of output speed, velocity or torque, ordinarily, more complex control of motor motion is done by a motion controller.

A motion controller incorporates specialized circuitry dedicated to real-time motion control in response to signals received from the position sensor. For example, the motion controller may implement the well known proportional/integral/derivative (PID) type control loop. The motion controller typically includes a general purpose computer which may be programmed to provide a series of useful control functions. For example, the velocity profile of the motor's motion between two positions may be controlled. Profiles for such motion may be selected in the program to be a trapezoid, where the velocity ramps linearly up or down at the beginning or end of the motion, or an "S curve" or "parabola", in which the straight ramps of the trapezoid are replaced by curved shapes having constrained higher derivatives.

Motion control functions having general use in multiple applications may be incorporated as instructions into a higher level "motion control" language. The operator programs the motion control computer using these instructions and standard computer instructions like branching instructions and loop instructions.

The instructions for programming the motion controller may be entered via a programming terminal attached to the motion controller. Typically, these instructions are in the form of human readable alphanumeric mnemonics which are received by the motion controller and stored in internal memory. For example, the characters "M100" might be used to instruct the motion controller that the motor should be moved by 100 units.

Typically, during real-time control of the motor, an interpreter program within the motion controller converts each alphanumeric mnemonic of the program into machine instructions, one at a time as the instructions are needed. The machine instructions may be directly executed by the general purpose computer of the motion controller to produce the necessary output signals needed to drive the motor amplifier.

It is known to display on a computer screen, a schematized picture of the controlled process, such as a conveyor line, indicating its physical operation as it is controlled. Such a picture displays the outputs and inputs to the motion controller, as they affect the controlled process, and may indirectly permit the monitoring of the operation of the controller as manifest in interactions between the motion controller and the controlled process. Such pictures of the process being controlled will be termed data-flow representations because they primarily indicate the data-flow between the inputs and outputs of the control process.

Such data-flow representations may assist the human programmer in verifying the operation of the control program being executed by the motion controller. Nevertheless, the use of such data-flow representations in troubleshooting or "debugging" the control program is limited by the fact that the important internal operation of the control program is not shown and may not be apparent from the outputs to or inputs from the controlled process. This shortcoming is most acute when outputs to the controlled process are complex logical combinations of inputs, output and internal states of the controlling program—as is often the case.

SUMMARY OF THE INVENTION

The present invention provides a programming aid useful for troubleshooting a real-time motion control program represented as a series of interconnected graphical icons, where each icon depicts one or more sequential steps of the motion control program. As the motion control program runs in real-time, the visual aspect of the icons is modified to provide a direct and immediate indication of the internal operation of the control program. This is in contrast to the data flow representation, described above, which cannot show the internal operation of the control program.

The depiction of the present invention will be termed a "sequential-flow representation" indicating that it directly illustrates the sequence of steps of the motion control program.

Specifically, the present invention provides a method for programming a motion controller where the first step is the selection of a set of graphical icons to be displayed on an electronic display where each icon represents at least one sequential step in the control of the motor. The icons are interconnected so as to provide an indication of the sequence of the steps employed in the program and the interconnected icons are converted to instructions of a control program in accordance with the sequence of interconnections. The control program is run on the controller to control the motor and the icons on the electronic display are modified in appearance as the instructions of the control program associated with those icons are run on the controller.

It is one object of the invention to provide a real-time and intuitive representation of the operation of a control program beyond that which may be achieved simply by observing the inputs and outputs of the controlled process.

Modifying the icons in synchrony with the running of the control program may be accomplished by periodically polling the motion controller to provide an indication of the address of the portion of the control program currently being executed and then using a separate computer, associated with the electronic display, to match the portion of the control program to the particular icon to be modified and to modify that icon.

It is thus another object of the invention to permit real-time visual tracking of the control program without disrupting the real-time control process. The polling may be done at a low rate, compatible with the speed at which a human operator may assimilate visual data. By limiting the interaction between the motion controller and the display to a simple communication of an address, this infrequent interruption may be discharged quickly so that the total overhead added to the control tasks of the motion controller remains insignificant.

The matching of the address of the control program to a particular icon may be accomplished by associating instructions of the program with a block identifier indicating the icon from which the instructions were derived during the initial compilation. The programming computer may then read the control program or a copy to quickly identify the icon related to each program address.

After icons that have been interconnected are converted to a control program, one or more icons may be selected as a breakpoint. The address of the portion of the control program related to that icon may be determined and that icon may be modified in appearance when that portion of code is run as indicated by the address.

It is thus another object of the invention to provide an indication that the control program has executed one or more internal steps without interrupting the real-time nature of the control. By changing the appearance of an icon, the functioning of a particular portion of the control program may be verified without stopping the control program. Again, the overhead involved in effecting this break point is minimized by relating the icon to an address in the control program which may be simply detected.

Once the interconnected icons are converted to the instructions of a control program, the program may be run and the appearance of a first icon may be modified, that icon being associated with a first instruction. Further instructions are then run until instructions are reached that are not associated with the first icon. The running of the control program is then stopped until a restart command is received.

It is thus another object of the invention to provide a stepping mode of reviewing the internal operations of a control program employing the intuitive notions of the graphic icons yet accounting for the fact that a graphic icon may embrace more than one instruction or sequential step in the control process. After an icon is modified, indicating that its functions are being executed, additional instructions are run until all instructions related to that icon have been executed. Thus, correlation between the modification of the icon and the running of the instructions associated with that icon may be preserved even for single step operation.

The foregoing and other objects and advantages of the invention will appear from the following description. In the description, reference is made to the accompanying drawings which form a part hereof and in which there is shown by way of illustration a preferred embodiment of the invention. Such embodiment does not represent the full scope of the invention, however, and reference is made to the claims herein for interpreting the scope of the invention.

DETAILED DESCRIPTION OF THE PREFERRED EMBODIMENT

Figure 1:
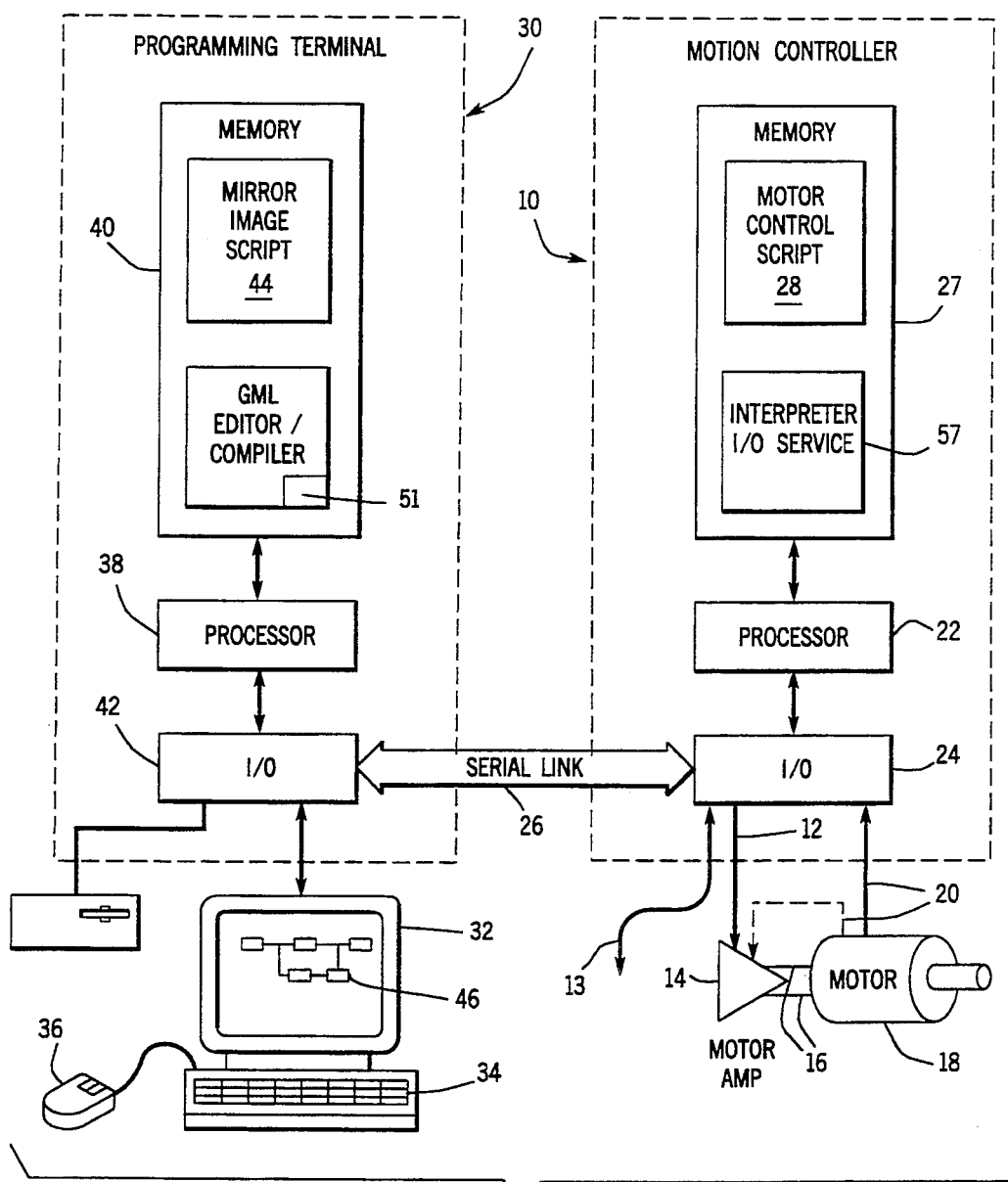
FIG. 1 is a block diagram showing the major components of a motion controller and its accompanying programming terminal illustrating the duplicate control scripts contained in the programming terminal and the controller as used in the present invention.

Referring to FIG. 1, a motion controller 10 may provide command signals 12 to a motor amplifier 14 which in turn provides controlled power, through power cables 16, to servo motor 18. The motor amplifier 14 is selected to match the requirements of the servo motor 18 and may be a high powered DC amplifier if servo motor 18 is a DC motor or may be an amplifier with commutating ability if servo motor 18 is a brushless AC motor. A suitable servo motor 18 and motor amplifier 14 is sold by Allen-Bradley, the assignee of the present application, under the designation 1386DS motor and 1386/1326DS DC servo drive system.

The motor incorporates a rotary shaft encoder (not shown) which provides position feedback signals 20 received by the motion controller 10 for use in its feedback control algorithms. As is known in the art, the position feedback signals 20 would also be provided to the motor amplifier 14 for commutating control when servo motor 18 is a brushless AC-type motor.

Motion controller 10 includes a processor 22 generally consisting of a specialized motion control microprocessor and dedicated peripherals which together produce the necessary command signals 12 and receive the position feedback signals 20 through input/output ("I/O") circuitry 24. The processor 22 may, for example, be a 80960SD motion control microprocessor manufactured by the Intel Corporation having offices in Santa Clara, Calif.

The I/O circuitry 24 may include a serial communications port for connecting to a serial link 26 as is well known in the art. The processor 22 also communicates with computer memory 27 which is a combination of dynamic random access memory ("DRAM"), erasable programable read only memory ("EPROM") and battery backed, nonvolatile static random access memory ("SRAM").

Generally, during operation, the processor 22 receives data and program instructions from the memory 27 to provide command signals 12 to the motor amplifier 14 in response to a motion control script 28 and in response to position feedback signals 20 received from the servo motor 18. The motion control script 28 comprises data and programming instructions and is contained within memory 27.

The motion control script 28 is generated by a programing terminal 30 communicating with the motion controller 10 via the serial link 26 as received by I/O circuitry 24. The programming terminal 30 may be a general purpose PC-type computer having a display 32 and an input device such as keyboard 34 and mouse 36. The programming terminal 30 includes a processor 38, being a general purpose microprocessor, memory 40, and I/O circuitry 42. Importantly, in the present invention, memory 40 of the programing terminal 30 holds a mirror image script 44 being identical to the motion control script 28 held in memory 27 of the motion controller 10. I/O circuitry 42 receives the serial link 26 and thus permits communication of digital data and programming instructions between the programming terminal 30 and the motion controller 10. I/O circuitry 42 also provides communication between the processor 38 and the display 32 for displaying information relevant to the programming and operation of the controller 10, and between the processor 38 and the keyboard 34 and mouse 36.

GRAPHICAL PROGRAMMING

Figure 2:
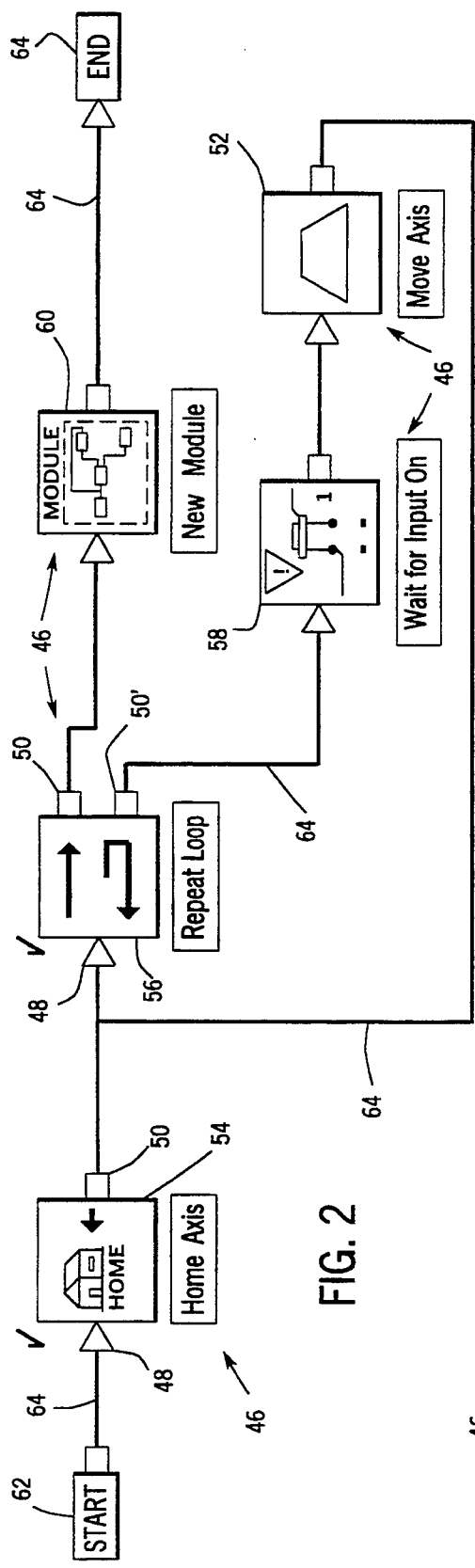
FIG. 2 is the image of a computer display showing graphic icons, each representing a sequential control function, interconnected to form a control program such as might be displayed on the programming terminal of FIG. 1 and executed on the controller of FIG. 1.

Referring now to FIGS. 1 and 2, the mirror image script 44 and motion control script 28 hold the necessary instructions and data needed to carry out the desired control of the servo motor 18. These scripts 44 and 28 are generated by means of a graphic motion control language (GML) editor 45 contained in memory 40 which permits programming in a graphical motion control language "GML" whose instructions are represented by function block icons 46 that may be displayed on display 32 and which each represent one or more instructions that may be interpreted by the processor 22.

The icons 46 are pictorial representations of the functions performed by the instructions associated with the icon and are framed by a square outline. One or more input terminals 48 are associated with each icon 46 and are represented by an arrow head to the right of and pointed inward toward the square outline of the icon 46. Likewise, one or more output terminals 50 are associated with each icon 46 and are represented by blackened squares abutting the right side of the square outline of the icon 46.

Each icon 46 represents one or more predefined instructions in the high level language interpreted by the motion controller 10. For example, the high level instruction of MOVE AXIS is represented by a move axis icon 52 which is associated with instructions that cause the movement of the servo motor 18. The move axis icon 52 has programmable parameters, values for which may be entered by means of keyboard 34. For example, operator entered parameters control the profile of the motion, e.g.: trapezoidal, S-curve or parabolic, and the maximum speed of the motion. Other parameters may also be entered such as the destination position. Thus the move axis icon 52 ultimately represents a collection of predefined instructions and operator entered data necessary to undertake a particular function.

Other functional blocks include those that effect a return of the servo motor 18 to a predefined home position, represented by the home axis icon 54, those that await and accept an external input, represented by the wait-for-input-on icon 58. Icons 46 may also represent logic or flow instructions represented in low-level computer languages, for example, the repeat loop icon 56 which permits the repetitive execution of other icons for a predetermined number of times.

Groups of icons 46 may be visually and functionally braced within a module icon 60 which may be "exploded" to reveal the contained modules. The instructions of the icons 46 contained within the module icon 60 are executed upon execution of the module. Thus, module icon 60 acts as a visual representation of a subroutine in the motion control language. The icons are generally captioned according to their function; the module icons 60 are initially given the caption "New Module" which may be changed by the operator.

Many additional icons 46 are available for instructions providing functions such as checking a timer status, activating and deactivating feedback algorithms, performing mathematical calculations, activating control outputs, providing printed reports to the operator and accepting operator input from an on-line terminal (not shown).

Each of these different icons 46 may be placed on the display 32 associated with the programming terminal 30. Specifically, the icons 46 are selected from a pallet of possible functional blocks (not shown) representing the predefined high level instruction set of the motion controller 10 and positioned by means of the mouse 36. Once positioned, the programmable parameters required by the function of each icon may be entered. For example, in the repeat loop icon 56, the number of repetitions must be entered through the keyboard 34.

The icons are then interconnected by means of their input and output terminals 48 and 50 between special start and end icons 62 and 64, respectively, to indicate the sequence of instructions of the motion control script 28. In particular, the motion control script 28 ultimately produced begins at start icon 62 whose output terminal 50 may connected to one input terminal of one of the icons 46. For example, the output terminal 50 of the start icon 62 may be connected to the input terminal 48 of the home axis icon 54.

Such connections between icons are represented by a sequence line 65 on the display 32. The sequence line 65 between the start icon 62 and the home axis icon 54 indicates that at the start of the motion control script 28, the first set of instructions are those associated with the home axis icon 54 and thus that the motor initially is returned to a home position.

Continuing with this example, the output terminal 50 of the home axis icon 54 may be connected to the input terminal 48 of the repeat loop icon 56 which executes a loop defined on a path from its lower most output terminal 50, for the specified number of repetitions.

The lower most output terminal 50 of the repeat loop icon 66 may in turn be connected to the input terminal of a wait-for-input on icon 58. Thus, the program after positioning the servo motor 18 at a home position, per the instructions of the home axis icon 54, waits for an input from one of the control I/O lines 13 to the motion controller 10 as designated as a parameter of the wait-for-input-on icon 58. When that designated input is received, the control process continues following the path represented by a sequence line 65 from the output terminal of the wait-for-input-on icon 58 to the input terminal of a move axis icon 52.

The move axis icon 52 executes the instructions necessary to move the servo motor 18 by a predetermined amount as programmed by the operator through parameters entered by keyboard 34. At the conclusion of this move axis, the program may be caused to proceed back to the input terminal 48 of the repeat loop icon 56 so as to repeat this sequence of waiting and moving reflected by wait-for-input-on icon 58 and move axis icon 52 for a specified number of times.

The upper right most output terminal 50 of the repeat loop icon 56 provides the next instructions for the motion control script after the looping has terminated. In this case, the output of the repeat loop icon 56 is shown connected to an input of a module entitled "reset procedure" as represented by module icon 60 which may incorporate one or more additional modules for functional blocks (not shown).

The conclusion of the motion control script 28 defined by the icons 46 and sequence lines 65 is indicated by a connection between the output terminal 50 of an icon 46 to the input terminal of the end icon 64.

All of the instructions necessary to generate a motion control script 28 for controlling a servo motor 18 may be rapidly and intuitively generated through the use of these iconic representations of programming steps as interconnected by sequence line 65 between a start icon 62 and an end icon 64. The icons in conjunction with the use of modules 60 provide a clean visual representation of the program as logically divided by icon grouped functions and by module grouped icons. The use of the icons and modules, which allow groups of functional blocks to be thus collected, prevents visual clutter and clearly emphasizes the structure of the motion control script.

The positioning and interconnection of the icons 46 on the display 32 is performed by manipulation of the mouse 36 which may "drag" the icons to the desired position and "draw" interconnecting lines by selecting line endpoints on the desired icons 46. Once the icons 46 are interconnected, a connection list is generated identifying each displayed icon by a different block identification number 66 together with its connection to other functional blocks. No two icons, even if they invoke the same functions, have the same block identification number 66.

The operator then instructs the programming terminal 30 to compile the motion control script 28 to be downloaded into the motion controller 10. The compilation is performed by a compiler program forming part of the GML editor 45 and which generates the motion control script 28 from instructions and data associated with the selected and interconnected icons 46 and in the order of the interconnection of the icons 46.

In the example of FIG. 2, the compilation starts at the start icon 62. The home axis icon 54 connected to the start icon 62 by a sequence line 65 is identified and the instructions necessary to produce the function of the home axis icon 54 is inserted into a portion of memory 40 allocated for the mirror image script 44 together with those parameters needed for that function as have been previously entered by the operator.

Figure 3:
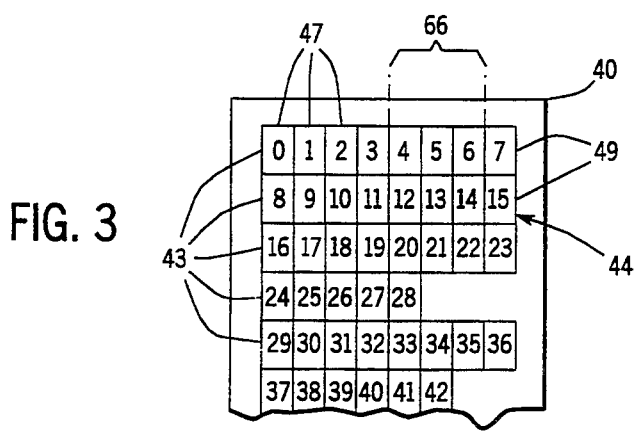
FIG. 3 is a schematic representation of the script of FIG. 1 as may be converted from the image of FIG. 2 showing the concatenation of block identifiers onto each line of the script.

Referring now also to FIG. 3, the function performed by the home axis icon 54 may require the execution of a number of instructions by the processor 22. Each instruction for a particular icon 46 is arranged in memory 40 as a series of "lines" 43 being contiguous words 47 of memory 40 terminated by a line return character 49. The words 47 of each line 43 hold ASCAII characters representing the human readable mnemonics of the instructions and the division of the memory into lines 43 reflects the logical separation of the characters into the mnemonic instructions.

The instructions of each line 43 and the number of lines 43 is predetermined by the icon 46 from which the lines are compiled. However, as described above, operator selectable parameters are typically associated with the functions of each icon 46 and change the number and length of the lines 43 associated with the given icon 46. Thus, the location of each instruction in memory 40 may vary depending not only on the preceding instructions of other icons but also on the parameters selected by the operator. For this reason, each line 43, as it is compiled, is associated with a block identification number 66 formed of several additional words 47 at the end of the line 43 prior to the line return character 49. Multiple contiguous lines may have the same block identification number 66.

At the conclusion of the compilation of a given icon 46, a next icon is compiled as determined by the sequence lines 65 and the instruction and parameters for that icon are concatenated to the existing mirror image script 44. In the example of FIG. 2, the next icon 46 is the repeat loop icon 56 which when compiled generates instructions causing the repeating of the functions of selected other icons 46 within the loop formed by sequence lines 65 connected to the repeat loop icon 56.

In this example, within that loop are the wait-for-input-on icon 58 and the move axis icon 52. Each line of instructions generated includes a block identification number 66 indicating the functional block from which the instructions were derived.

The compilation process continues for each of the icons 46 displayed on the display 32 and for each icon 46 within a module icon 60 and for icons 46 within modules 60 nested within other modules 60 until the end icon 64 is reached by a sequence line 65 indicating that the compilation is complete. Thus, the icons 46 provide a higher level graphical language producing an ASCAII "source code" which could be used (and previously was used) to directly program the motion controller 10.

Importantly, at the conclusion of the compilation, the mirror image script 44 comprises a continuous sequence of characters in words 47 arranged in lines 43 terminating in a block identification number 66 identifying the icon from which the instructions were derived and a line return character 49. Each character may therefore be assigned a script address being a sequential integer starting at zero and incremented according to the ordinality of the word 47 in the mirror image script 44 which clearly and uniquely identifies that word 47.

The mirror image script 44 is then transmitted by the processor 38 of the programming terminal 30 through the I/O circuitry 42 and serial link 26 into the motion controller 10 to be contained within the motion controller's memory 27 as motion control script 28, identical to the mirror image script 44, for execution by processor 22.

During that execution of the motion control script 28, each line 43 of the motion control script 28 is read by an interpreter-I/O service program 57 running on processor 22 which translates the mnemonic instructions of that line 43 into machine executable instructions or data for use by the processor 22.

During operation of the motion controller 10 in real-time, the processor 22 fetches one or more instructions from the memory 27, interprets those instructions and executes the interpreted instructions for control of the servo motor 18. According to the normal operation of memory 27, the processor reads the characters of the motion control script one at a time by providing sequential memory addresses to the memory 27 and receiving the contents of each word 47 of memory 27 in sequence. The particular memory address being interrogated in this manner is held in a register within the processor 22. Thus, at any given time, the processor 22 has data indicating the particular word 47 within the motion control script 28 being read. This memory address may be related to the script address previously described by an offset value being equal to the memory address of the first word 47 of the motion control script 28. Thus, it is a simple matter for the processor 22 to provide the script address of the word 47 currently being processed simply by providing the value of its register holding the current memory address minus this offset.

During the operation of the motion controller 10, the processor 22 executes a loop in which it alternately fetches and interprets instructions from the motion control script 28, for execution and control of the servo motor 18, and reads information from the serial link 26. The information from the serial link 26 may include commands, such as that commanding the start of the motion control, or data, such as that providing information needed to coordinate the particular motion controller 10 with other motion controllers 10 in a complex process.

GRAPHICAL DEBUGGING

The use of icons 46 and sequence line 65 in the programming of the motion controller 10 through the graphical motion control language presents the opportunity to provide a unique set of programming tools to aid in troubleshooting the generated motion control script 28. These commands are termed "graphical debug commands" and are in the form of ASCAII characters sent over the link 26 from the programming terminal 30 to the motion controller 10. In response to the commands, one or more words of data may be provided for the purpose of troubleshooting the compiled program represented by the motion control script 28, on a real-time basis.

The debugging commands are: TRACE which highlights on the display 32 the icon 46 whose instructions are currently being executed; BREAKPOINT which highlights a preselected icon 46 with or without stopping the program when an instruction identified to that icon 46 is encountered; and SINGLE STEP in which the program is stopped or slowed between transitions between instructions related to different icons 46 so as to more clearly illuminate its operation.

The use of a mirror image script 44 in the programming terminal 30 is instrumental in implementing these unique debugging tools with a minimum of disruption to the control program particularly with the use of TRACE and BREAKPOINT commands.

OPERATION OF THE TRACE COMMAND

Figure 5:
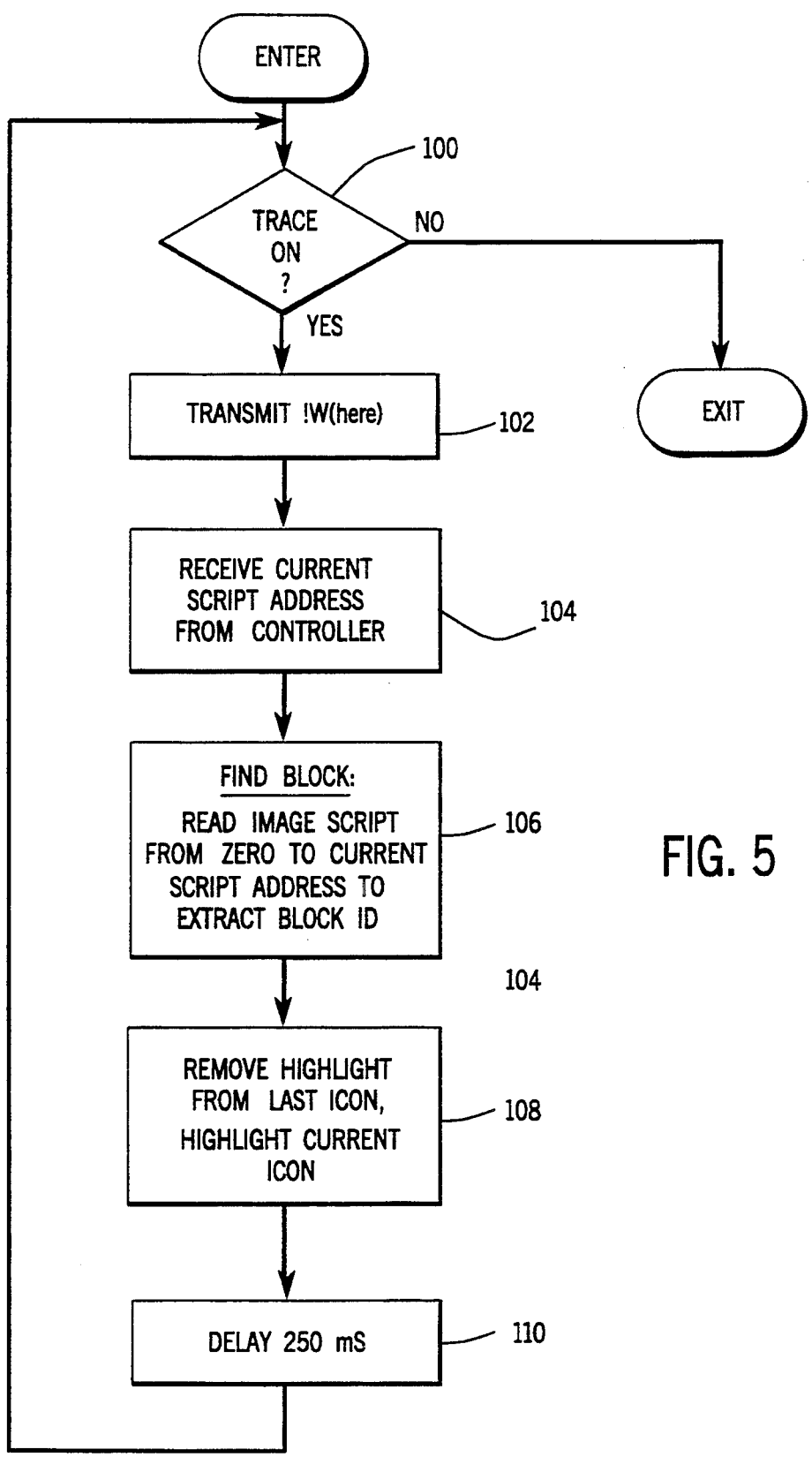
FIG. 5 is a flow chart indicating the steps performed by the programming terminal of FIG. 1 in tracing a real-time control program in which functional blocks are highlighted in the manner shown in FIG. 4.

Referring now to FIG. 5, the trace function is activated by a command entered by the operator via mouse 36 of programming terminal 30. Specifically, a debug program 51 opens a window and the mouse 36 may be used to "depress" a button image within this window activating the trace feature. This activation of the trace feature is shown by decision block 100 and is normally undertaken when the motion controller 10 is currently controlling the servo motor 18 in real-time using a motion control script 28.

Once the trace feature has been activated, the debug program 51 in the programming terminal 30 transmits a WHERE command (the characters !W) over the serial link 26 to the motion controller 10 on a periodic basis of once every 250 milliseconds. In order to distinguish the WHERE command from data and other commands on the serial link, it is bracketed by two ASCAII control characters control-N and control-O. The transmission is of the WHERE command is indicated by process block 102.

Upon receipt of a WHERE command through I/O circuitry 24, processor 22 of the motion controller 10 returns the script address of the instruction currently being executed from the motion control script 28. As described before, this script address is relative to the first word 47 of the motion control script 28 and requires only a simple integer calculation needing minimal processing time by the processor 22. The relative infrequency of the transmission of the WHERE command means that over a period of time, very little overhead is added to the control of the servo motor 18 by processor 22 to support this feature.

At process block 104, the programming terminal 30 receives the current script address from the motion controller 10 over the serial link 26. This script address in itself does not identify a particular icon 46 on the display 32 but the particular icon may be identified through the use of the FIND BLOCK routine indicated by process block 106.

The FIND BLOCK routine reads the mirror image script 44 within the programming terminal 30 starting at its first word 47. Every time a block identification number 66 is encountered, that block identification number 66 is saved as the current block identification number. This reading continues until the script address received from the motion controller 10 is reached, at which the FIND BLOCK routine ends providing the last block identification number 66 it encountered as the current block identification number.

At process block 108, the current block identification number is used to highlight the icon 46 on the display 32 corresponding with the particular instruction then being executed. If the icon 46 is contained within a module icon 60 on the screen, the module is "exploded" to reveal its internal functional blocks and the necessary functional block is highlighted. If the icon 46 is outside of an exploded module icon 60 then the icons of the module icon 60 are compressed in a "diving" operation known in the art. The exploding and diving is performed by a GO TO routine (not shown).

Figure 4:
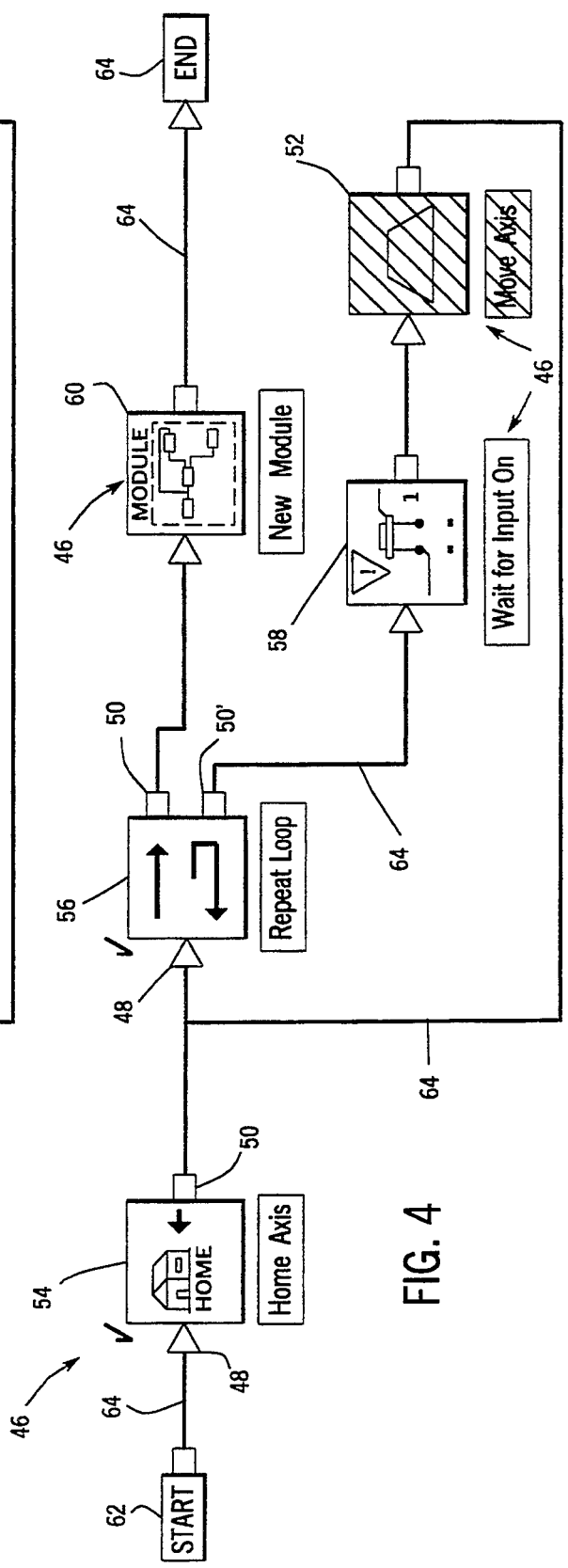
FIG. 4 is a figure similar to FIG. 2 showing one icon in highlighted form such as may be used to indicate progress of the control program when it is executing.

Referring to FIG. 4, in the preferred embodiment, the icon 46 whose instructions are being executed is rewritten on the screen in video inverted form where the value of each pixel of the image is changed between black and white so that an icon 46 having a black picture on a white background becomes an inverted icon having a white picture on a black background. The inversion is represented as hatching in FIG. 4. The advantage to this inversion is that only a single icon style need be stored and generally the inversion does not impair the readability of the icon 46.

If the icon 46 being highlighted is an icon representing the function of accepting an operator input from an on-line terminal (not shown) then the display 32 of the programming terminal 30 also provides a window emulating the display of the on-line terminal through which such operator input may be entered. When the program is run, if an icon 46 requires an operator input, the window emulating the display of the on-line terminal 30 opens automatically and flashes to notify the operator.

After a delay of 250 milliseconds per process block 110, the loop of process blocks of 100 to 110 is repeated. Thus, at quarter second intervals, the display 32 reveals those icons 46 whose instructions are currently being executed. It will be understood that the execution may be of such a speed that some icons 46 will not be highlighted through inversion of their images at any time during the running of the program despite the execution of their associated instructions. Nevertheless, the quarter second update provides information that is at a speed close to the maximum that may be easily assimilated by an observer and has been found to provide the guidance to the programmer needed to track the operation of the motion control script 28. It should be noted that the trace operation does not significantly affect the real-time execution of the motion control script 28 and thus is particularly well suited to real-time control situations. The burden of the tracing procedure is largely born by the programming terminal 30.

A PAUSE command (!P) may be transmitted to the motor controller 10 during the tracing function to stop the execution of the motion control script 28.

The interpreter-I/O service routine 57 running on the motion controller may operate in a "multi-tasking" mode in which the processor 22 regularly jumps between execution of various portions of the motion control script 28 so as to create an apparent simultaneous execution of different portions of the motion control script 28. For example, the multi-tasking may permit the "timer" of a timer icon to be incremented while a motor MOVE command is being executed. In such multi-tasking the actual portions of the motion control script 28 being executed will change in a manner seemingly unrelated to the ordinary logical sequence of the motion control process and during debugging the icons highlighted will vary similarly.

In such circumstances, in order to increase the useful information conveyed by the highlighting process, the highlighting of the icons 46 may be restricted to a single task of the multi-tasking operation of the processor 22. In this case, the WHERE command includes a task number and the processor 22 only responds with a script address when that designated task is being executed.

THE BREAKPOINT COMMAND

The trace operation provides an overview of the execution of the control program of the motion control script 28. Nevertheless, as described above, some icons 46 may never be highlighted as a result of the infrequent polling of the motion controller 10 with the WHERE command.

Figure 6:
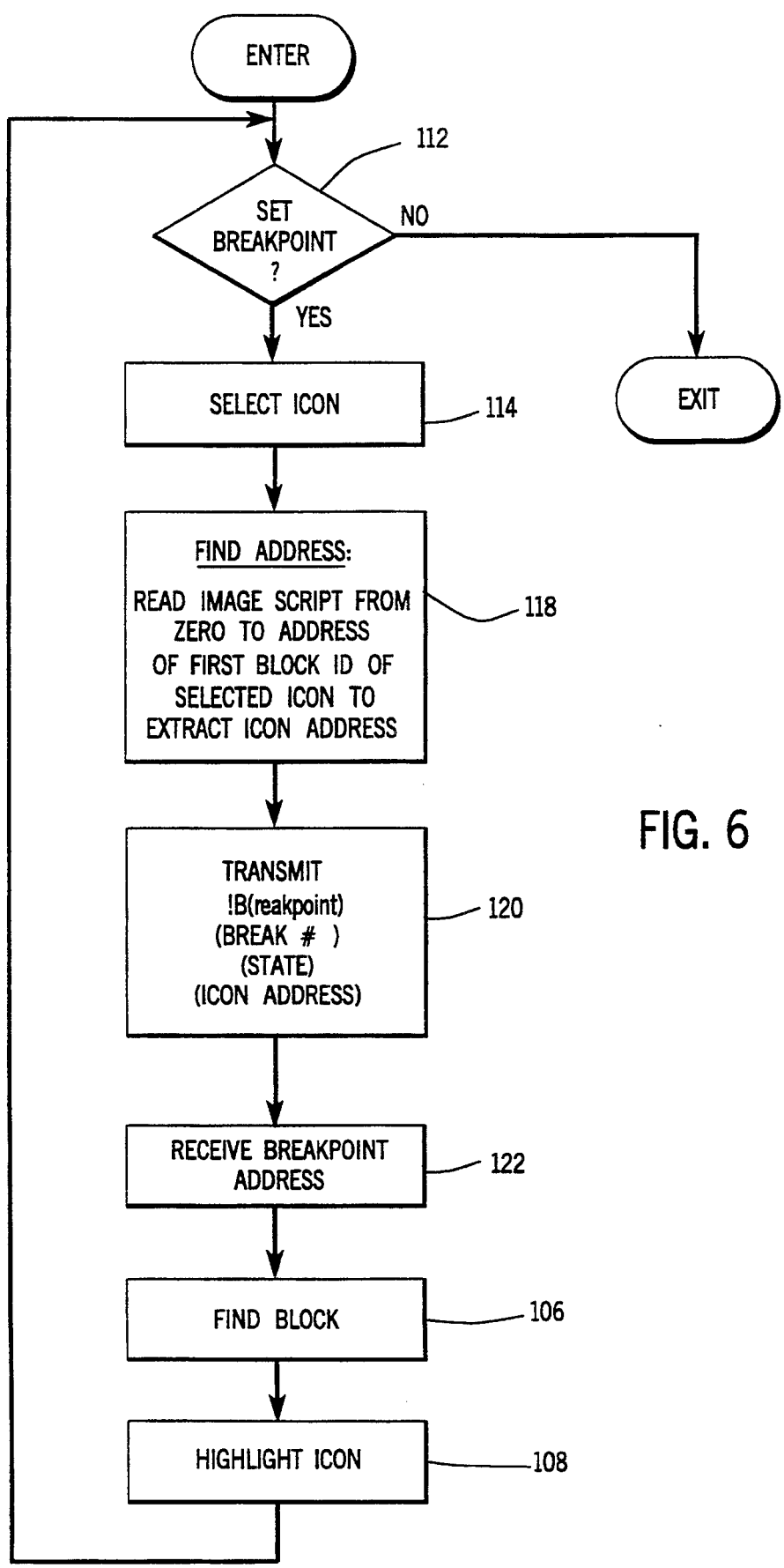
FIG. 6 is a flow chart indicating the steps performed by the programming terminal of FIG. 1 in setting breakpoints as identified by the icons shown in FIG. 2.

For this reason, referring now to FIG. 6, a BREAKPOINT command (!B) may be transmitted from the programming terminal 30 over the serial link 26 and used to set breakpoints that will be acknowledged by the interpreter-I/O service program 57 of the motion controller 10.

Referring to FIG. 6, at decision block 112, the operator may indicate the desire to set breakpoints. If so, the operator is prompted by the debug program 51 to select an icon 46 as displayed on the display 32 designating one of up to ten breakpoints. Once this breakpoint icon 46 is selected as indicated by process block 114, a FIND ADDRESS routine is entered, indicated by process block 118, in which the mirror image script 44 is read from script address zero to the address of the first line 43 having a block identification number 66 equal to that of the breakpoint icon.

This script address is then used as the breakpoint address and is transmitted over serial link 26 to the motion controller 10 as indicated by process block 120. Like the WHERE command, the BREAKPOINT command is bracketed by control characters control characters control-D and control-O. The format of the transmission is the !B character string plus the number of the breakpoint (from 1 to 10), its state as TRAP AND CONTINUE, BREAK AT, or OFF (as will be described) and the breakpoint address identified at process block 118.

The processor 22 will hold the breakpoint address and when the script address of the instructions currently executed by the processor 22 is equal to the breakpoint address, the processor 22 will react depending on the state transmitted with the break command. If the state is TRAP AND CONTINUE, then at process block 122, the motion controller 10 responds by transmitting the breakpoint address back over the serial link 26 and continues execution. Alternatively, the motion controller 10 may cease operation at the breakpoint if the state transmitted with the BREAK command was that of BREAK AT.

When the breakpoint address is received, the proper block is identified by the FIND BLOCK routine 106 as previously described and the icon is modified per the highlighting block of 108 previously described. The number of the breakpoint (from one to ten) and the name of the module 60 if any, and the name of the icon 46 are displayed in text form in a separate window on the display 32. This text record is buffered in the memory 40 of the programming terminal 30 and may be printed out to provide a chronological record of the debugging operation for later review. The program then returns to decision 112 wherein a new breakpoint can be set or where the old breakpoint may be disabled by sending a break command with the state of OFF and the appropriate address.

The trap and continue option of the breakpoint command allows insight to be gained into the control program without adversely affecting the real-time nature of its control. Although the overhead of the break command is more than that of the TRACE command, requiring a constant comparison by the program of the motion controller 10 to a set of breakpoint addresses, as with the TRACE command, the highlighting of the icon 46 on the display 32 and the identification of the icon from the script address is performed by the programming terminal 30 without interference with the motion controller 10.

THE SINGLE STEP COMMAND

Figure 7:
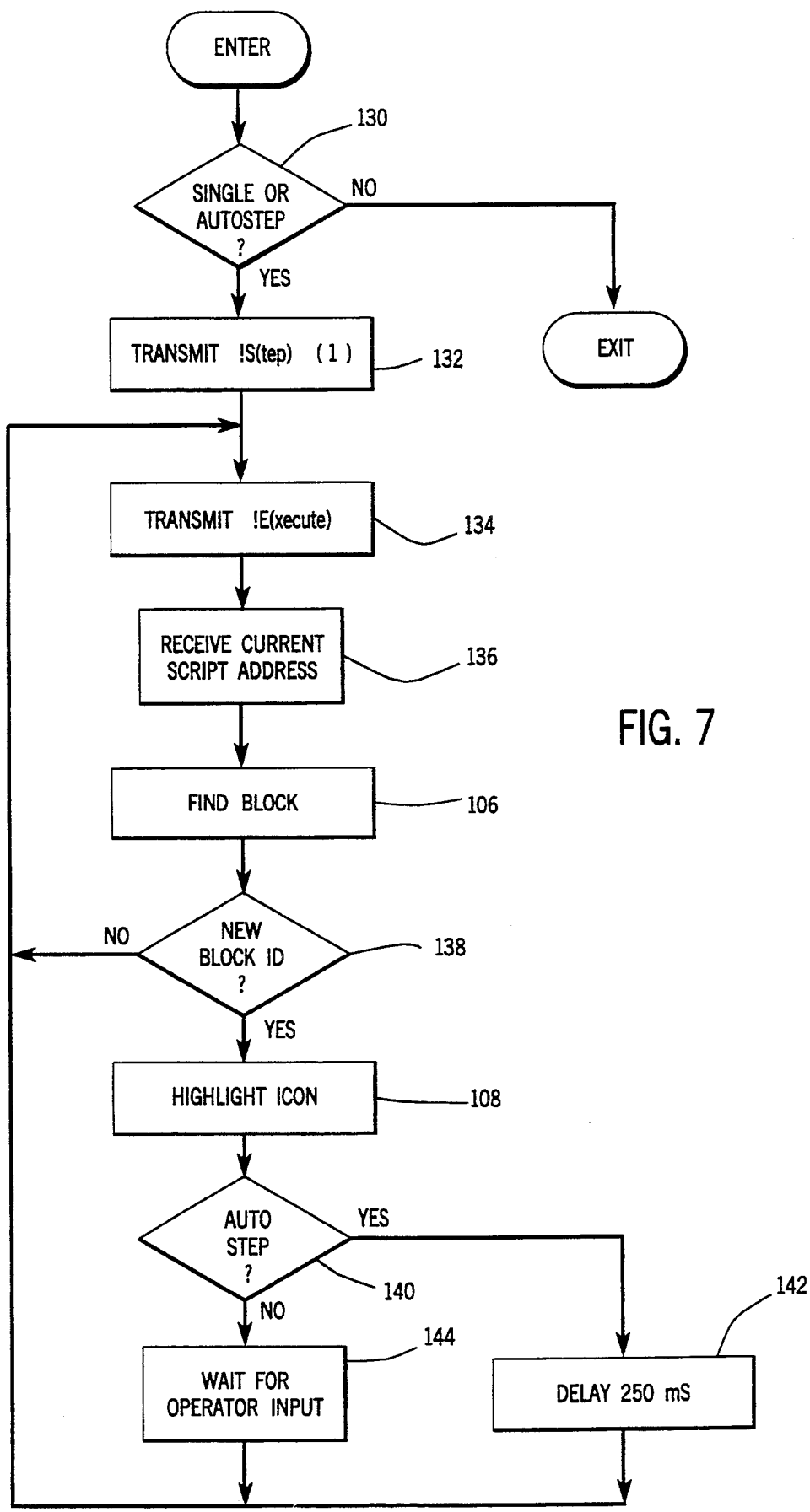
FIG. 7 is a flow chart indicating the steps performed by the programming terminal of FIG. 1 in stepping through the control program according to the division of the functional blocks by the icons shown in FIG. 2.

Referring now to FIG. 7, the motion controller 10 may also be operated in a single or autostep mode as designated by the operator in decision block 130. If a single or autostep is to be initiated, the SINGLE STEP (!S) command is transmitted, followed by a state of 1 for on or 0 for off as indicated by process block 132.

Once the step mode has been activated, an EXECUTE (!E) command is sent to the motion controller 10. Like the other debug commands, the !S and !E commands are bracketed by control characters to distinguish them from other forms of data on the serial link 26.

The motion controller 10 upon receiving the EXECUTE command responds with an acknowledgment and sends the script address of the next executable instruction as indicated by process block 136. This address is converted to an icon by the FIND BLOCK routine of process 106 as has been previously described which yields a block identification number 66.

At decision block 138, this block identification number 66 is compared with the previous block identification number, if any, from any previous executions of the loop of blocks 134, 136 and 106. If there is a previous block identification number and if it is identical to the current block identification number 66 returned by process block 106, the program loops back to process 134 to execute yet another instruction. Thus, the loop of process blocks 134 through 138 is continued until a new block identification number 66 is encountered indicating that a new icon 46 should be highlighted. This "microstepping" effectively accomplishes a stepping through the motion control script 28 on the basis of the aggregation of instructions in a single icon 46.

Once a new block identification number 66 is detected at decision block 138, the indicated icon 46 is highlighted at process block 108 as previously described.

Next, at decision block 140, if autostep mode is desired, the program branches to process block 142 where, after a delay of 250 milliseconds, the program loops back again to the top of decision block 130 where assuming the autostep mode is still activated, the program repeats process blocks 130 through 142 every 250 milliseconds. The effect in autostepping mode, therefore, is a stepping through of the script 28 on an icon by icon basis so that its operation can be verified.

Alternatively, at decision block 140, a single step mode may be implemented in which the program branches to process block 144 where a operator input is awaited before the next block is executed.

The SINGLE STEP command is the most intrusive with respect to its demands on the motor controller 10 and will not be acceptable in a situation where the process being controlled may not be arbitrarily slowed. Nevertheless, the step and autostep mode provide a clear visual indication of the operation of the program according to the logical and accessible groupings of the functional blocks.

While this invention has been described with reference to particular embodiments and examples, other modifications and variations will occur to those skilled in the art in view of the above teachings. Accordingly, the present invention is not limited to the preferred embodiment described herein, but is instead defined in the following claims.

We claim:

1. A method of programming a motion controller for the real-time control of a motor comprising the steps of:
    (a) selecting among a set of graphical icons to be displayed on an electronic display, each icon representing a sequential step in the control of the motor;
    (b) interconnecting the selected icons to indicate the sequence of steps in the control of the motor;
    (c) converting the selected icons into instructions of a control program following the sequence of interconnections;
    (d) running the control program on the motion controller to control the motor; and
    (e) modifying the appearance of selected icons on the electronic display as the instructions of the control program associated with each icon are run on the motion controller
    wherein the electronic display is controlled by a computer separate from the motion controller and wherein step (e) includes the steps of:
    periodically polling the motion controller to provide to the separate computer with an address of a portion of the control program currently being executed;
    using the computer to match the address to a particular icon to be modified; and
    modifying the icon matched to the address.

2. The method of claim 1 wherein the instructions are associated with other characters identifying the icon from which the instructions were converted and wherein the separate computer in matching the address, reads the control program to obtain the identifying characters of the instructions at the address.

3. A method of programing a motion controller for the control of a motor comprising the steps of:
    (a) selecting among a set of graphical icons to be displayed on an electronic display, each icon representing a sequential step in the control of the motor;
    (b) interconnecting the selected icons to indicate the sequence of steps in the control of the motor;
    (c) converting the selected icons into instructions of a control program following the sequence of interconnections;
    (d) after the converting, identifying at least one icon as a breakpoint icon;
    (e) determining a portion of the control program into which the breakpoint icon was converted;
    (f) running the control program on the motion controller to control the motor; and
    (g) modifying the appearance of the selected icon when the portion of the control program associated with the breakpoint icon is run on the motion controller.

4. The method of claim 3 including the additional step of:
    (h) stopping the running of the control program.

5. A method of programing a motion controller for the control of a motor comprising the steps of:
    (a) selecting among a set of graphical icons to be displayed on an electronic display, each icon representing a sequential step in the control of the motor;
    (b) interconnecting the selected icons to indicate the sequence of steps in the control of the motor;

(c) converting the selected icons into instructions of a control program following the sequence of interconnections;
(d) identifying portions of the control program into which the selected icons were converted;
(e) running instructions of the control program on the motion controller to control the motor until the portion of the control program associated with a first icon is run on the motion controller;
(f) modifying the appearance of the first icon;
(g) running additional instructions of the control program until no portion of the control program associated with the first icon is running on the motion controller; and
(h) awaiting a restart command before again running the control program.

* * * * *